Nov. 17, 1936.　　　F. W. TURNBULL　　　2,061,260

ICE CREAM CONE

Filed Feb. 7, 1935

INVENTOR
F. W. Turnbull
BY
Henry Savage
ATTORNEY

Patented Nov. 17, 1936

2,061,260

UNITED STATES PATENT OFFICE 2,061,260

ICE CREAM CONE

Francis W. Turnbull, Chattanooga, Tenn., assignor to Turnbull Cone & Machine Company, Chattanooga, Tenn., a corporation of Tennessee Application February 7, 1935, Serial No. 5,375

6 Claims. (Cl. 99—137)

My invention relates to cup pastry and particularly to pastry cups that are used for serving ice cream, and other foods and confections. When adapted for serving ice cream such pastry cups usually are made with hollow conical bodies or handles each terminating in an open mouth which may be a continuation of the body or may be formed by a bowl shaped enlargement or an outwardly flaring top, but my invention is not limited to any precise shape.

When serving ice cream in such pastry cups, or cones as they are commonly called, it is difficult to hold the cream securely in the mouth of the cone especially if the cream be hard or the serving large. Very frequently the ice cream falls off and is lost to the consumer. The principal object of the present invention is to provide an ice cream cone or other cup pastry that is made so that it will securely hold the serving of ice cream or other food.

Figure 1:
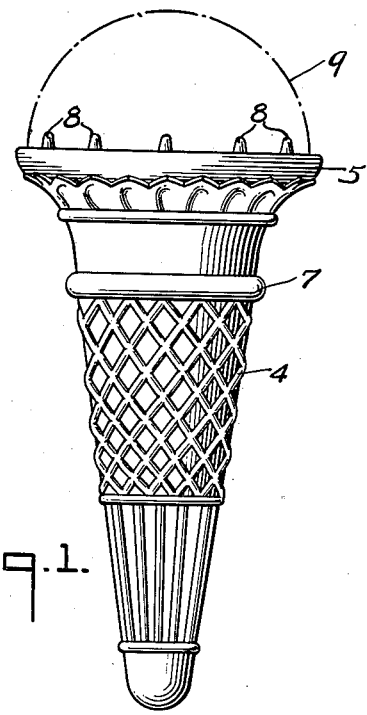
Figure 2:
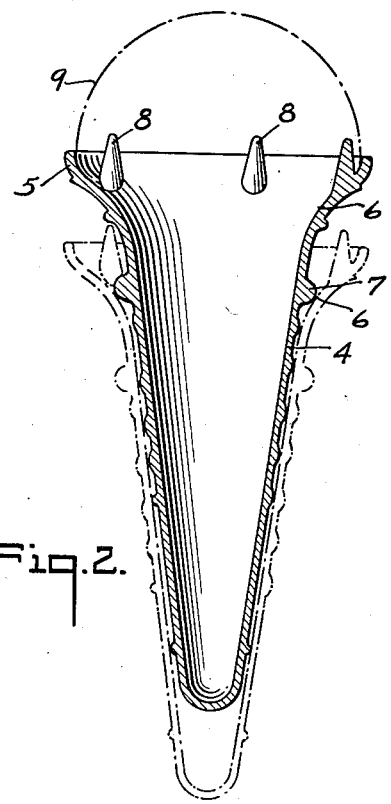
Figure 3:
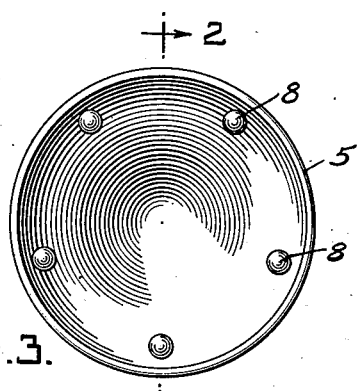
Figure 4:
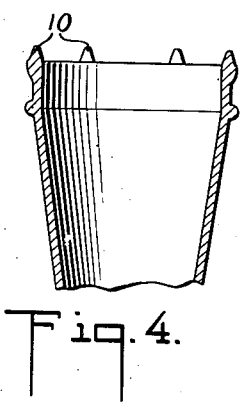

In the accompanying drawing, I have shown one form that my invention may take wherein Fig. 1 is a side elevation of an ice cream cone embodying the invention and showing how a large serving of ice cream is held thereon; Fig. 2 is a sectional view of two nested cones, taken substantially on the line 2 of Fig. 3; Fig. 3 is a top plan view of the cone of Figs. 1 and 2; and Fig. 4 shows a modified form of the invention.

The cup pastry illustrated has a hollow conical stem or handle 4 which may be plain or ornamented in any suitable way and terminates at the top in a flaring mouth 5, which however may be of the common cup shape or a straight continuation of the body 4. Preferably the mouth curves outwardly so as to provide a shoulder 6 on which the nesting bead 7 will rest when the cones are nested together as in Fig. 2. Within the mouth or top of the cone and extending from its inner wall, I provide a number of upstanding pales or teeth 8 which may be conical as shown or any other shape that will impale the ball of ice cream, indicated by the line 9, and prevent its falling out of the cone. I have shown five pales which extend above the cone, but any number may be used and they may terminate at, above or below the top of the cone as may be found best for each design, size or style of cone.

When the invention is embodied in a straight conical cone or a cup cone of usual construction, the pales will of course extend from what is normally the top of the cone, the top being somewhat thicker than the body of the cone. Such a cone is shown in Fig. 4, wherein the pales or teeth 10 are shorter than in Figs. 1 and 2, but of course they may be of any length, number or shape that will serve the purpose of holding the ball of cream.

Having thus described one form of my invention, I claim all forms and modifications thereof that may come within the scope of the following claims:

1. A pastry cup having a number of pales extending upwardly within its open mouth and spaced apart a distance greater than their greater thickness.

2. A pastry cup having an outwardly curved mouth and a number of pales extending upwardly from the inner curved wall of the mouth and spaced apart a distance greater than their greater thickness.

3. A pastry cup having an open mouth and a number of pales extending beyond the top of the pastry cup, the distance between adjacent pales being not less than their greatest thickness.

4. A pastry cup having a conical stem terminating in an outwardly curved mouth and a plurality of conical pales projecting from the inner surface of the mouth.

5. A pastry cup having a conical stem merging into an enlarged mouth and a plurality of conical pales with their bases formed at the inner surface of the mouth and their points extending beyond the top of the pastry cup.

6. A pastry cup having its top thicker than the body portion, there being a number of spaced pales projecting upward from the open top and located within the inner and outer circumferences thereof.

FRANCIS W. TURNBULL.

CERTIFICATE OF CORRECTION.

Patent No. 2,061,260.                                                November 17 1936.

FRANCIS W. TURNBULL.

It is hereby certified that error appears in the printed specification of the above numbered patent requiring correction as follows: Page 1, second column, lines 19 and 24, claims 1 and 2 respectively, for the word "greater" second occurrence, read greatest; and that the said Letters Patent should be read with these corrections therein that the same may conform to the record of the case in the Patent Office.

Signed and sealed this 5th day of January, A. D. 1937.

Henry Van Arsdale (Seal)                                                      Acting Commissioner of Patents.